July 3, 1923.                                            1,460,809
A. BOOMERSHINE
OIL RETAINER FOR JOURNAL BOXES
Filed Jan. 30, 1919
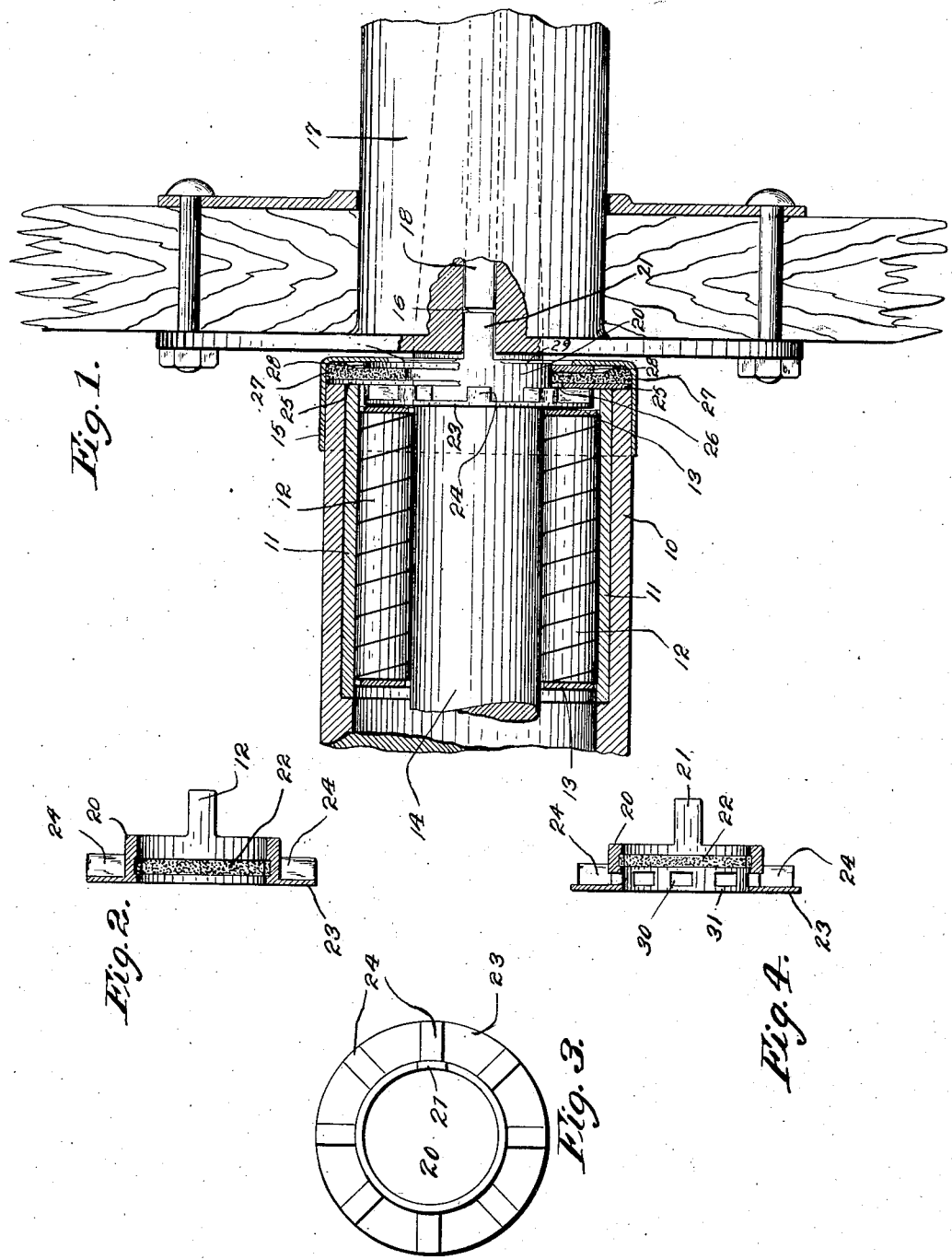
WITNESSES:                                               INVENTOR.
Frank O. Ellerman.                                       Adam Boomershine,
                                                         BY
                                                         F. K. Fassitt
                                                         ATTORNEY Patented July 3, 1923.

1,460,809

UNITED STATES PATENT OFFICE.

ADAM BOOMERSHINE, OF DAYTON, OHIO, ASSIGNOR OF ONE-HALF TO JOHN C. SLAGER, OF DAYTON, OHIO.

OIL RETAINER FOR JOURNAL BOXES.

Application filed January 30, 1919. Serial No. 273,938.

*To all whom it may concern:*

Be it known that I, ADAM BOOMERSHINE, a citizen of the United States, residing at No. 18 Victor Avenue, in Dayton, in the county of Montgomery and State of Ohio, have invented a new and useful Oil Retainer for Journal Boxes, of which the following is a specification.

My present invention relates to oil retainers for various types of journal boxes, but in its present embodiment it is peculiarly adapted to use on the rear axles of automobiles. A great deal of difficulty has always been experienced from oil leaking out of the rear axle boxes and getting on the friction members of the brake mechanism. While this trouble is usually inherent in the journal construction it is much aggravated by the wearing of the bearings, particularly where the wear results in considerable lateral play of the axle in the box, and one of the objects of my invention is to provide for retaining the oil in the boxes even after the axles have come to have excessive lateral play. Another object is to utilize certain features of construction in the axle to be equipped, thus permitting the equipment of axles already in use. Other objects will appear as the description of my invention proceeds.

In the accompanying drawing,

Fig. 1 is a plan view of a rear axle of a well known make of automobile, shown principally in section.

Fig. 2 is a sectional plan view of the journal bulkhead, an important element of the oil retainer.

Fig. 3 is an end view of the journal bulkhead.

Fig. 4 is a sectional plan view of a modified form of journal bulkhead.

The "axle" to be equipped in the present case with an oil retainer, consists of a bearing housing 10, bushing 11, bearing rolls 12, cage 13, axle, or more properly speaking the journal 14, and the bearing housing cap 15. The axle 14 is provided with a keyway 16, as is also the wheel hub 17, and the wheel hub is made to rotate in unison with the axle by a spline 18. The cap 15 fits tightly on the end of the bearing housing.

The oil retainer will now be described: On the axle 14 I place a sleeve 20, which is provided with a tongue 21 extending into the keyway in the wheel hub 17, whereby the sleeve is made to rotate in unison with the axle. The sleeve is made to fit with reasonable closeness on the axle, but not so tight as to prevent its free movement endwise on the axle. A groove 22 on the inside of the sleeve is provided with a felt ring, which acts as a packing to prevent oil creeping through the sleeve. I do not consider this an essential feature, however, because the sleeve and axle rotating as an integer practically eliminates all tendency for oil to run through at this point. The principal object of the felt ring is to take care of occasional cases where the sleeve fits rather too loosely on the axle. The sleeve is provided with an annular flange 23, one side of which is provided with a series of radiating vanes 24. For convenience I will refer to the parts just described as the journal or axle bulkhead.

In the cap 15 I secure an annular ring 25. This ring, which is preferably of steel, is fitted tightly in the cap so as to form a substantially oil tight joint at its periphery, and is provided with an axial aperture 26 of such size as to accommodate the sleeve 20, which passes through it, and allow for as much lateral play of the axle as will ever occur. Next to the ring 25, on the side toward the head of the cap, I place a felt ring 27, which has an axial aperture no larger than the sleeve 20, and between this felt ring and the head of the cap I confine a retaining ring 28, which is also preferably of steel. This ring encircles the end of the sleeve 20, having a running fit thereon, and for the purpose of holding the parts all together the end of the sleeve is spun out over the ring, as at 29. This, however, is principally for keeping the parts in place until the retainer is installed, after which the parts are kept in place by their environment.

I will call the ring 25 and felt ring 27, the journal box bulkhead, its function being to close the end of the box, and it is desirable that the journal bulkhead have face to face contact with one side while the retaining ring has face to face contact with the other side of the box bulkhead. The felt ring has considerable resiliency, which facilitates the maintenance of these contacts.

In operation the retaining ring remains stationary, being confined between the felt ring and the head of the cap, both of which are stationary. The sleeve 20 and other parts constituting the journal bulkhead rotate with the axle. When the axle plays laterally the retaining ring moves with it though it does not rotate. The resiliency of the felt ring permits of lateral play in the journal while continuing to hug the sleeve 20 and the felt is kept in reasonably close contact with the sleeve by its confinement by the retaining ring. I do not rely upon the felt ring for preventing the escape of oil, as oil will seldom or never reach it. This is because of the action of the vanes 24 on the journal bulkhead. These constantly wipe the oil from the face of the ring 25 and throw it outwardly by centrifugal force, back into the bushing 11, the action being similar to that disclosed and claimed in my Patent Number 1,270,776. While the vanes are very effective for the purpose described I do not regard them as essential to the success of my device; very excellent results may be obtained by a simple annular flange having face to face contact with the ring 25. On the other hand I have devised a plan for augmenting the action of the vanes, which is illustrated in Fig. 4. In this device I perforate the sleeve 20 between each pair of vanes, with apertures 30. Any oil getting inside of the sleeve is drawn out through these apertures by the centrifugal action of the vanes, the action being somewhat analogous to that of a centrifugal pump. If desired channels may be made in the sleeve at 31 to facilitate the flow of oil to the apertures 30 and the vanes used as a means for circulating the oil in the box.

While I have described the preferred embodiment of my invention for the purpose of protecting the brake mechanism of an automobile, I do not wish it to be understood that I limit myself to the particular structure shown, as various structural modifications are possible without departing from the invention defined in the appended claims.

What I claim is as follows:

1. An oil retainer for an automobile axle, comprising a cap tightly fitted to the bearing housing, said cap having an aperture in its head through which the axle passes; a metallic ring tightly fitted in said cap, also having an axial aperture for the passage of the axle; a felt ring and a retaining ring confined between said metallic ring and the head of the cap; a sleeve on the axle having a tongue adapted to enter the keyway in the wheel hub so that it will be driven in unison with the axle and hub, said sleeve having an annular flange with radiating vanes which lie against the inner face of the ring which is fixed in the cap, said sleeve extending through said ring, the felt ring and the retaining ring, having a running fit in the latter.

2. An oil retainer for journal boxes, comprising a bulkhead composed of a ring of relatively hard material, fixed against lateral motion and oil tight with reference to the journal box, and a ring outside thereof composed of yielding substance; a bulkhead on the journal shaft, comprising a member on the inside of and having face to face contact with said hard ring; a retaining member on the outside of and having face to face contact with said yielding ring, and means for maintaining a fixed angular relationship between the journal bulkhead and the journal.

3. An oil retainer for journal boxes, comprising a bulkhead composed of a ring of relatively hard material, fixed and oil tight with reference to the journal box, and a ring outside thereof composed of a yielding substance, the former ring having an axial aperture of such size as to permit a reasonable lateral play of the journal in the box; a bulkhead on the journal comprising a member on the inside of and having face to face contact with said hard ring; a retaining ring on the outside of the box bulkhead but connected to the journal bulkhead and having face to face contact with said yielding ring, the journal bulkhead and retaining ring being fixed against lateral movement on the journal but adapted to play laterally with reference to the box bulkhead along with the journal.

4. An oil retainer for journal boxes, comprising a bulkhead whose perimeter has an oil tight union with the journal box, said bulkhead having an axial aperture large enough to permit the journal a reasonable lateral play; a bulkhead on the journal inside of and having face to face contact with said box bulkhead, said journal bulkhead being adapted to prevent flow of oil past it on the journal and being also adapted to play laterally along with the journal while maintaining the face to face contact with the box bulkhead, and a retaining ring outside of and having face to face contact with the box bulkhead, said ring being free to play laterally with reference to the box bulkhead but not with reference to the journal.

5. An oil retainer for journal boxes, comprising a bulkhead whose perimeter has an oil tight union with the journal box; a bulkhead on the journal, comprising an annular flange having radiating vanes on the side adjacent to the box bulkhead, the edges of said vanes lying in a common plane and being in contact with the box bulkhead; means for maintaining said contact and means for driving the bulkhead in unison with the journal.

6. An oil retainer for journal boxes, comprising a bulkhead whose perimeter has an oil tight union with the box and having an aperture through which the journal passes; a sleeve on the journal which also passes through said aperture, said sleeve having an annular flange inside of the box bulkhead, vanes on said flange, the lateral edges of which are in a common plane and abut the inside face of the box bulkhead; a retaining ring mounted with a running fit on the sleeve, said ring having a face to face contact with the outside of the journal bulkhead, and means for maintaining the vanes in contact on one side and the retaining ring in contact on the other side of the box bulkhead.

7. An oil retainer for journal boxes, comprising a bulkhead fixed oil tight in the journal box, said bulkhead having an axial aperture large enough to permit the journal a reasonable lateral play; a bulkhead on the journal inside of and having face to face contact with the box bulkhead, said bulkhead being secured against lateral play on the journal, means for maintaining an angular velocity between the bulkheads equal to that of the journal with reference to the box; and a retaining ring outside of and having face to face contact with the box bulkhead, said ring being united to the journal bulkhead so as to confine the box bulkhead and maintain said face to face contacts, and having a running fit but no lateral play with reference to the journal and journal bulkhead.

8. An oil retainer for journal boxes, comprising a bulkhead fixed oil tight with reference to the box, said bulkhead permitting lateral play of the journal in the box; but having no lateral play itself with reference to the box; a bulkhead on the journal inside of the box bulkhead, said journal bulkhead having no lateral play with reference to the journal shaft but being free to play laterally a reasonable distance with reference to the box bulkhead, said bulkheads having face to face contact; and means for maintaining said contact.

9. An oil retainer for journal boxes, comprising a bulkhead fixed oil tight in the box, said bulkhead permitting lateral play of the journal in the box; a bulkhead on the journal inside of the box bulkhead, said journal bulkhead having no lateral play with reference to the journal but being free to play laterally a reasonable distance with reference to the box bulkhead, said bulkheads having face to face contact; means for maintaining said contact and means for maintaining an angular velocity between the bulkheads equal to that of the journal with reference to the box.

10. An oil retainer for journal boxes, comprising a bulkhead fixed oil tight in the journal box, a bulkhead on the journal inside of the box bulkhead, said bulkheads having face to face contact; means for maintaining said contact and means for maintaining an angular velocity between the bulkheads, equal to that of the journal with reference to the box.

11. An oil retainer for journal boxes, comprising a bulkhead fixed against lateral motion and oil tight with reference to the journal box through which the journal shaft passes, said bulkhead having an aperture larger than the journal, a bulkhead on the journal, and means independent of the journal and indifferent to the position of the journal in the journal box, for maintaining face to face contact between said bulkheads.

12. An oil retainer for journal boxes, comprising a bulkhead fixed oil tight in the journal box, a bulkhead on the journal inside of the box, adapted to play longitudinally on the journal; the side of said bulkhead facing the box bulkhead having radial vanes adapted to lie against the box bulkhead; and apertures between the vanes through which oil that has entered between the journal and bulkhead may flow under the action of centrifugal force and be carried between and by the vanes to the perimeter of the bulkhead and thrown back into bearing.

13. An oil retainer for journal boxes, comprising a bulkhead whose outer perimeter has an oil tight union with the box; and having an aperture larger than the journal, so as to permit lateral play of the journal in the box; a bulkhead on the journal, adapted to move longitudinally with reference to the journal but not permit oil to pass between itself and the journal, said bulkhead being inside of the box and adapted to sustain contact with the inner face of the box bulkhead regardless of changes in the position of the journal in the box, and notwithstanding one of the bulkheads is rotating with reference to the other; and means for maintaining said contact of the bulkheads.

14. An oil retainer for journal boxes, comprising a bulkhead whose outer perimeter has an oil tight union with the box and having an aperture larger than the journal, so as to permit lateral play of the journal in the box; a bulkhead on the journal adapted to move longitudinally thereon, the aperture through which the journal passes having an annular groove containing a packing ring to prevent oil passing between the journal and bulkhead, said bulkhead being inside of the box and having face to face contact with the box bulkhead; and means for maintaining said contact.

15. An oil retainer for journal boxes, comprising a bulkhead whose perimeter has an oil-tight connection with the journal box, said bulkhead being immovable, laterally, with reference to the box, but having an axial aperture large enough to permit the journal shaft a reasonable lateral play in the box, a bulkhead on the journal shaft having face to face contact with said box bulkhead, said bulkheads being adapted to sustain said face to face contact when the journal plays laterally in the journal box, means for maintaining said face to face contact, and means for maintaining a fixed angular relationship between the journal bulkhead and the journal.

16. An oil retainer for journal boxes, comprising a bulkhead whose perimeter has an oil-tight connection with the journal box, said bulkhead being immovable, laterally, with reference to the box, but having an axial aperture large enough to permit the journal shaft a reasonable lateral play in the box, a bulkhead on the journal having face to face contact with the box bulkhead and so attached to the journal that the journal may move endwise with reference to said bulkheads, thereby permitting said face to face contact to be maintained when the journal moves either laterally, longitudinally, or both ways simultaneously in the box, and means for maintaining said face to face contact.

17. An oil retainer for journal boxes, comprising a cap adapted to fit over the end of the box, and immovable, laterally, with reference thereto having an aperture through which the journal passes, said aperture being larger than the journal, a ring slipped on the journal and adapted to sustain face to face contact with said cap, and means for maintaining said contact whether the journal plays laterally, longitudinally, or both, in the box.

18. An oil retainer for journal boxes, comprising a cap adapted to fit over the end of the box and having an aperture through which the journal passes, said aperture being larger than the journal, a ring slipped on the journal and adapted to sustain face to face contact with said cap, means for maintaining said contact whether the journal plays laterally, longitudinally, or both, in the box, a wheel mounted on the journal in juxtaposition to the aforesaid ring, keyways in the journal and wheel hub, a spline therein whereby the journal drives the wheel, said spline being short enough to leave a portion of the keyway vacant, and a tongue on the ring which extends into said vacant portion of the keyway, whereby the ring is made to rotate in unison with the journal.

ADAM BOOMERSHINE.